A. K. & H. P. Hood,
Bench Dog,
No. 62,748. Patented Mar. 12, 1867.

Witnesses:
Abiel Pevey
Geo. E. Pevey

Inventors:
A K Hood
Harrison P. Hood

UNITED STATES PATENT OFFICE.

ABRAHAM K. AND HARRISON P. HOOD, OF LOWELL, MASSACHUSETTS.

Letters Patent No. 62,748, dated March 12, 1867

IMPROVEMENT IN BENCH-DOGS.

*The Schedule referred to in these Letters Patent and making part of the same.*

TO ALL WHOM IT MAY CONCERN:

Be it known that we, ABRAHAM K. and HARRISON P. HOOD, both of Lowell, county of Middlesex, and State of Massachusetts, have invented new and useful improvements in Bench-Hooks; and we do hereby declare that the following is a full and exact description thereof, reference being had to the accompanying drawings, and to the letters of reference marked thereon.

The nature of our invention consists in the arrangement and construction of the case, hook, spindle, and cam, as hereinafter described.

To enable others skilled in the art to make and use our invention, we will proceed to describe its construction and operation.

Figure 1:
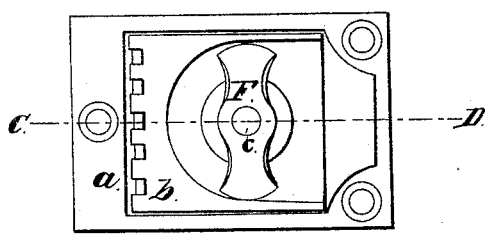
Figure 1 represents a plan of our improved bench-hook.
Figure 3:
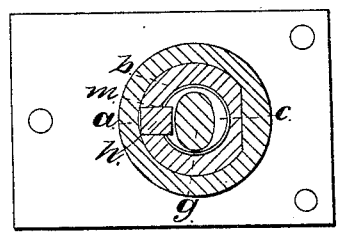
Figure 3 represents a longitudinal section through A and B of fig. 2.
Figure 2:
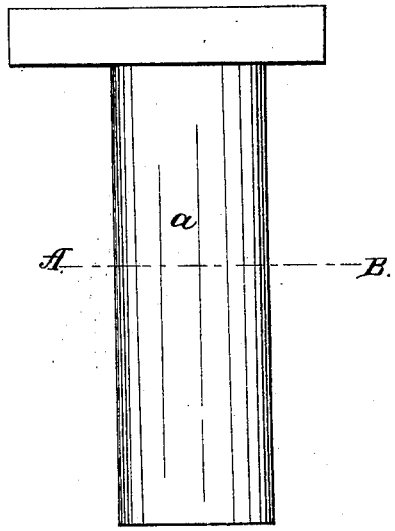
Figure 2 represents a side elevation of the same.
Figure 4:
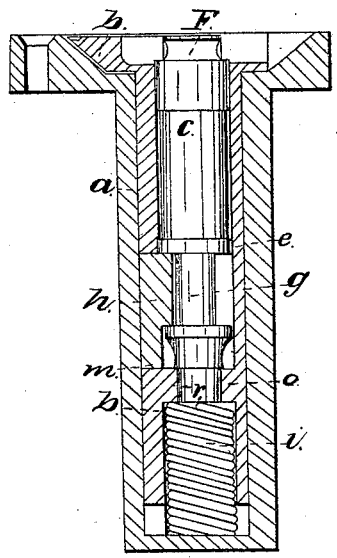
Figure 4 represents a vertical section through C and D of fig. 1.

$a$ represents the case, $b$ the hook, $c$ the cam-spindle with its bearings $d$ $e$ and $o$, $f$ the spindle-wrench, $g$ the cam, $h$ the pressure-block, and $i$ the spiral spring. We construct the outside of the case $a$ as seen at figs. 2 and 3. The body being round and the top square, supersedes the necessity of cutting a square hole through the bench. The socket $n$, or inside of the case $a$, may be made in different forms, but we prefer the form as shown in the drawings; the top of the case $a$, being so formed as to receive the hook $b$, flush with the top of the case $a$ when on its seat. The outside of the hook $b$ is so formed as to correspond with the internal shape of the case $a$, the top of the hook $b$ being serrated in the usual way; also, a recess is formed of sufficient depth and diameter for the reception and action of the spindle-wrench $f$. A hole is made through the hook $b$ for the reception of the cam-spindle $c$, this hole being contracted at $r$, which forms the bearing $o$, as seen at fig. 4, also leaving below the bearing $o$ a recess for the reception of the spiral spring $i$. Between the bearings $d$ and $o$, in the hook $b$, a hole or mortise is made for the reception of the pressure-block $h$, which is to be nicely adjusted and fitted to the same, being of the required size and shape. The cam-spindle $c$ is formed so as to fit the bearings $d$ $e$ and $o$; also a suitable cam, $g$, is formed on the same to give the requisite action and pressure when operated against the pressure-block $h$. These several parts being finished, put together, and adjusted in their proper places, the hook is then fastened to the bench in any desired location. The operator then, by aid of the spindle-wrench $f$, turns the spindle $c$, which relieves the cam $g$ from the pressure-block $h$; this instantly causes the hook $b$ to rise by the means of the spiral spring $i$. When the hook $b$ is at its desired height the operator fastens and secures the same at will by reversing the motion of the spindle $c$. To lower or depress the hook $b$ to any point, or on its seat, the operator simply gives a slight turn to the spindle $c$, which relieves the cam $g$ from the pressure-block $h$, presses down the hook $b$ to its required place and is then held and fastened by the action of the cam $g$, as before.

The simplicity, efficiency, and cheapness of the article when manufactured, its easy adjustment and attachment to the bench, render it of great value, and when once used its service cannot well be dispensed with.

What we claim as our invention, and desire to secure by Letters Patent, is—

The cam-spindle $c$ and block $h$ when operating substantially as described and for the purpose fully set forth.

ABRAHAM K. HOOD,
HARRISON P. HOOD.

Witnesses:
ABIEL PEVEY,
GEO. E. PEVEY.